(12) United States Patent
Lee

(10) Patent No.: US 6,219,487 B1
(45) Date of Patent: Apr. 17, 2001

(54) RECORD MODE DISCRIMINATING APPARATUS USING NON-PILOT REPETITIVE SIGNALS

(75) Inventor: Hyun-soo Lee, Suwon (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 0 days.

(21) Appl. No.: 08/263,744

(22) Filed: Jun. 22, 1994

(30) Foreign Application Priority Data

Jun. 30, 1993 (KR) ................................. 93-11965

(51) Int. Cl.7 .................................................. H04N 5/7826
(52) U.S. Cl. ............................ 386/67; 360/18; 360/73.06; 386/95
(58) Field of Search ......................... 360/69, 71, 73.01, 360/73.04, 73.05, 73.06, 73.07, 18, 27, 10.1–10.3, 19.1, 33.1–386; 386/67, 46, 68, 69, 81, 95, 96, 98

(56) References Cited

U.S. PATENT DOCUMENTS

| | | | |
|---|---|---|---|
| 4,044,389 | * 8/1977 | Oldershaw | 360/73.07 |
| 4,330,795 | * 5/1982 | Foerster et al. | 360/33.1 |
| 4,550,345 | * 10/1985 | Terada et al. | 360/73.07 |
| 4,607,298 | * 8/1986 | Yamashita | 360/73.07 |
| 4,663,673 | * 5/1987 | Doutsubo | 360/27 |
| 4,991,027 | * 2/1991 | Enoki | 360/27 |
| 5,019,923 | * 5/1991 | Ogaki | 360/73.07 |
| 5,057,784 | * 10/1991 | Park | 360/73.06 |
| 5,132,807 | * 7/1992 | Takimoto et al. | 360/19.1 X |
| 5,146,373 | * 9/1992 | Wakui et al. | 360/73.06 |
| 5,319,499 | * 6/1994 | Kim et al. | 360/10.3 X |
| 5,477,396 | * 12/1995 | Fukami et al. | 360/10.3 |
| 5,477,398 | * 12/1995 | Ichikawa et al. | 360/10.2 X |
| 5,521,766 | * 5/1996 | Minoda et al. | 360/33.1 |

* cited by examiner

Primary Examiner—W. R. Young
Assistant Examiner—James L Habermehl
(74) Attorney, Agent, or Firm—Sughrue, Mion, Zinn, Macpeak & Seas, PLLC

(57) ABSTRACT

A record mode discriminating apparatus used in a magnetic recording/reproducing system records a record mode discriminating signal having a predetermined periodicity that is dependent upon the record mode being used to record an audio/video signal. The record mode discriminating signal is recorded along with the audio/video signal and a pilot signal. During reproduction of the recorded signals in a search mode the record mode discriminating signals are detected and the record mode is determined therefrom. The detected record mode is used to control the speed of the recording medium during playback.

13 Claims, 3 Drawing Sheets

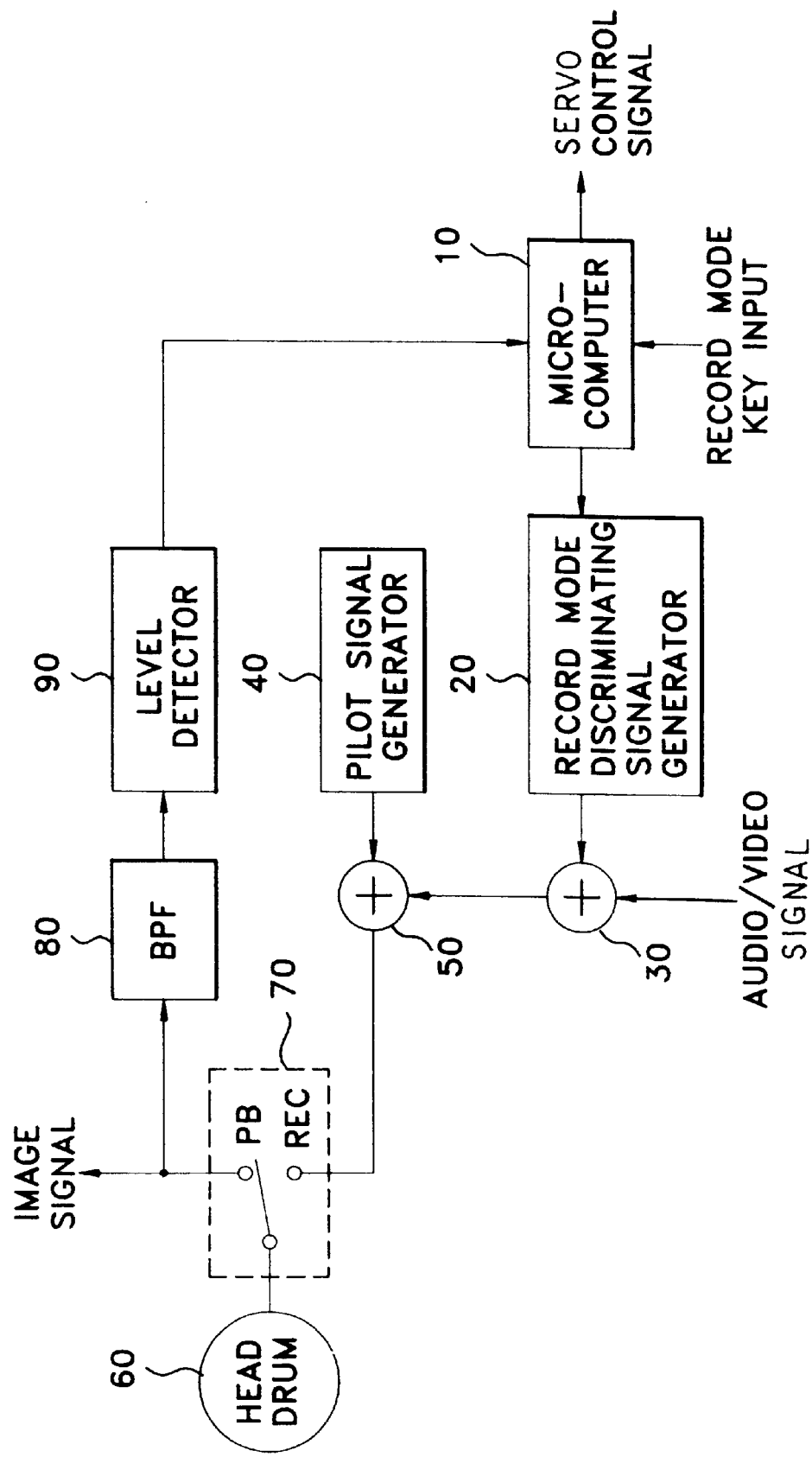

FIG. 4A SP DISCRIMINATING SIGNAL
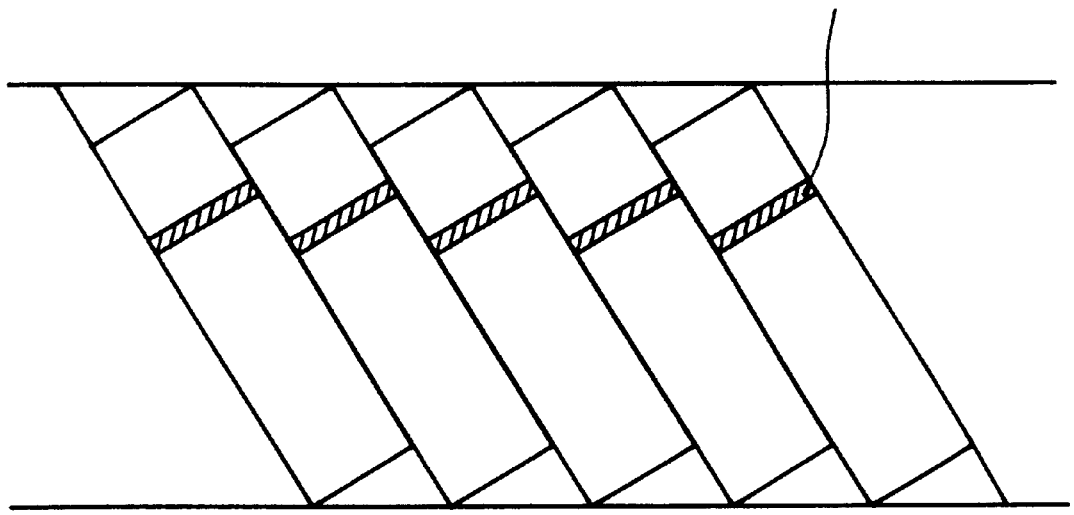
FIG. 4B LP DISCRIMINATING SIGNAL
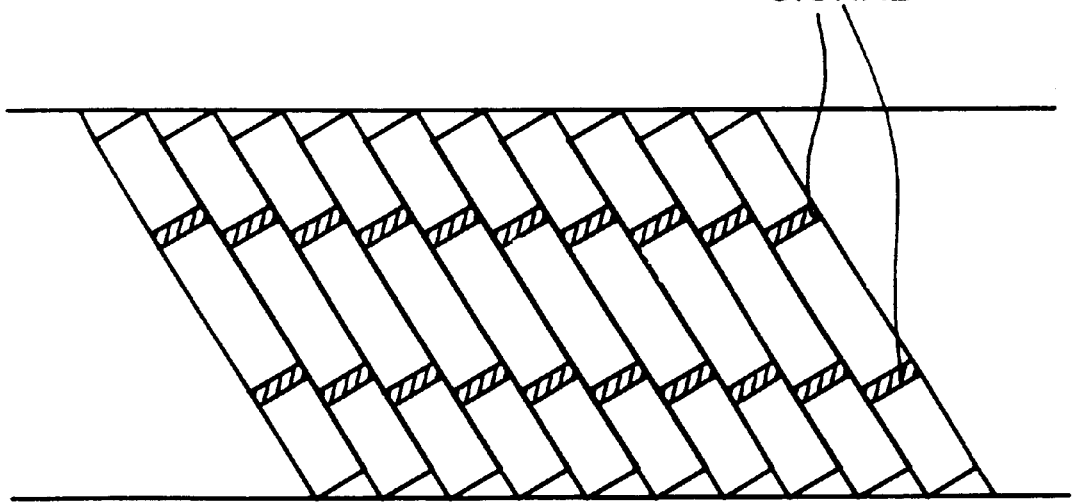

RECORD MODE DISCRIMINATING APPARATUS USING NON-PILOT REPETITIVE SIGNALS

BACKGROUND OF THE INVENTION

The present invention relates to a record mode discriminating apparatus employed in a magnetic recording/reproducing system, and more particularly, to a record mode discriminating apparatus which records signals of a specific frequency band having a predetermined periodicity that varies depending on the recording mode, e.g., standard play (SP) or long play (LP). The signals are recorded with an audio/video signal on a record media in 8 mm camcorder. The record mode discriminating apparatus discriminates a record mode by employing the periodicity of the specific frequency band signal detected when a reproduction is performed in a search mode.

In general, as shown in FIG. 1, video tape for 8 mm video equipment utilizes only video region A where an image signal is recorded. The frequency distribution of the signal recorded in video region A is shown in FIG. 2 and includes, a pilot signal, an AFM (Audio FM) signal, a chrominance signal (C), and a luminance signal (Y). Four pilot signals, f1, f2, f3 and f4, in the band from 100KHz to 160KHz, are employed as an automatic track finding (ATF) signal when one frame is constituted by four tracks as is usual. The AFM (Audio FM) signal is in the 1.5 MHz ±100 KHZ band; the chrominance signal (C) is converted into a low frequency band having a center frequency at 743 KHz; and the luminance signal (Y) is in the 4.2 MHz to 5.4 MHz band.

Inasmuch as the length of video tape used as the recording media is limited in image signal recording/reproducing systems, such as a VCR or camcorder, it is desirable to provide a function for recording more information over a long time.

In an analog system, a recording can be made at a lowered speed (1/N), where N is the standard running speed. This allows recording over a longer than standard period with a limited tape length. Thus, a long play (LP) mode or super long play (SLP) mode, where the time period recordable on a given length tape is increased relative to that in a standard play (SP) mode, can be used. The LP mode has a recordable time period twice that of the SP mode by running the tape at half the standard speed, while the SLP mode has a recordable time period three times that of the SP mode by running the tape at one-third of the standard speed.

However, an 8 mm camcorder has only SP and LP modes as record modes, and when a reproduction operation is performed, the system determines whether the signal recorded on the video tape is recorded in the SP mode or LP mode. Normal screen quality can be obtained only if the reproduction is performed in accordance with the determination of the recording mode; i.e., if a signal recorded in LP mode is reproduced in LP mode and if a signal recorded on SP mode is reproduced in SP mode.

In a conventional 8 mm camcorder, when reproduction is performed in a search mode such as fast forward or rewind, the determination of whether the recording mode is LP or SP is made by examining the envelope level of the ATF signal. However, when the envelope level differential between SP and LP mode is small or when noise is included in the ATF signal, discriminating between SP mode and LP mode may be impossible or at least difficult. When the latter occurs, a hunting phenomenon, which causes a periodic rolling undulation, occurs.

SUMMARY OF THE INVENTION

It is an object of the present invention to provide in a magnetic recording/reproducing system a record mode discriminating apparatus, which records signals of a specific frequency band having a predetermined periodicity that varies depending on whether the audio/visual signal is being recorded in the SP or LP mode. During reproduction, the system determines the recording mode of the recorded signal by examining the periodicity of the specific frequency band signal detected when a reproduction is performed in a search mode.

To accomplish the above object, the present invention provides in a magnetic recording/reproducing system, a record mode discriminating apparatus, which records an audio/video signal having a predetermined frequency band and a pilot signal for automatic track finding onto a recording media by means of a read/write head, and reproduces the audio/video signal from the recording media by employing the read/write head, the apparatus comprising: record mode discriminating signal generating means for generating a record mode discriminating signal of a specific frequency band having a periodicity that is varied depending on the record mode; mixing means for mixing the record mode discriminating signal, the audio/video signal and the pilot signal and transferring the mixed signal to the read/write head; detecting means for detecting the record mode discriminating signals from among signals reproduced by the read head; and means for detecting the record mode of said reproduced signals form the discriminating signals detected by the detecting means, whereby the reproduction mode can be carried out at the same mode speed as the record mode at which the signals were recorded.

BRIEF DESCRIPTION OF THE DRAWINGS

The above objects and other advantages of the present invention will become more apparent from the following detailed description of a preferred embodiment thereof with reference to the attached drawings in which:

FIG. 3 is a block diagram of an embodiment of a record mode discriminating apparatus according to the present invention; and FIG. 4A and FIG. 4B illustrate, respectively, an SP mode discriminating signal and an LP mode discriminating signal recorded onto an 8 mm video tape by employing the record mode discriminating apparatus shown in FIG. 3.

DETAILED DESCRIPTION OF THE INVENTION

Figure 1:
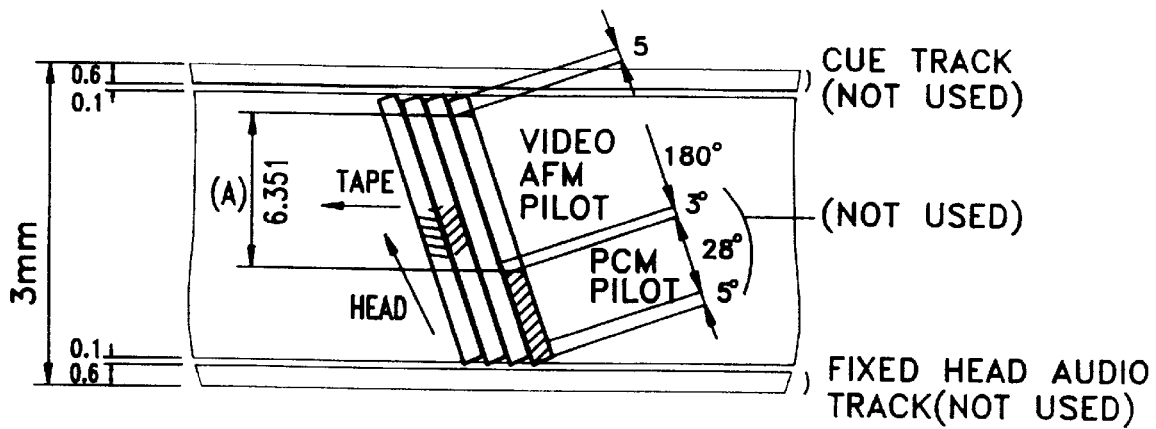
FIG. 1 illustrates a common 8 mm video tape format.
Figure 2:
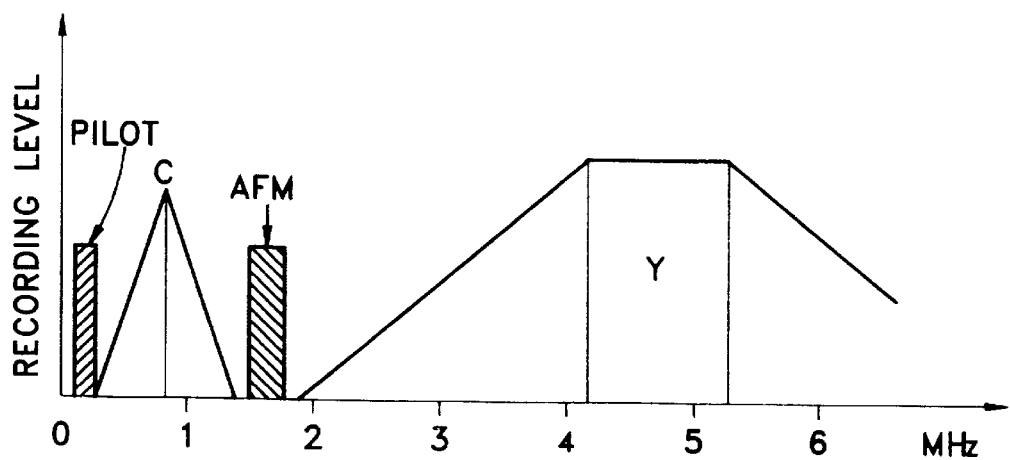
FIG. 2 illustrates a frequency distribution of the video region A shown in FIG. 1.

The record mode discriminating apparatus shown in FIG. 3 includes a microcomputer 10 for generating a signal of a predetermined periodicity that is varied according to the record mode. A record mode input key, not shown, provides an input to the microcomputer to indicate the selected record mode. The microcomputer also generates a servo control signal in response to an output signal of a level detector 90. A record mode discriminating signal generator 20 generates a signal of a specific frequency band having a predetermined periodicity corresponding to that of the output from microcomputer 10. A first mixer 30 mixes an audio/video signal to be recorded onto a recording media with the record mode discriminating signal output from record mode discriminating signal generator 20. A pilot signal generator 40 generates a specific pilot signal for each track, and a second mixer 50 mixes the output signal of the first mixer 30 with the output signal of the pilot signal generator 40. A head drum 60 is provided for rotating the head relative to the video tape recording medium. A control switch 70 connects the output signal of the second mixer 50 to the head drum during a recording operation as to permit recording of the mixed signal onto the record media. Also, during a playback operation, the switch 70 connects the signal read by the record head to an image signal output terminal and to a band pass filter 80. The bandpass filter (BPF) 80 passes only the signal of a specific frequency band among the signals reproduced from the record media. A level detector 90, which comprises a low-pass filter, detects the level of the signal output from bandpass filter 80.

The operation of the apparatus shown in FIG. 3 can be understood with reference to FIG. 4A and FIG. 4B.

Referring to FIG. 3, the microcomputer 10 generates a signal, such as a pulse, with a predetermined periodicity that varies in accordance with the record mode key input thereto. The record mode key input represents the actual record mode (LP or SP) being accomplished by the system. The record mode discriminating signal generator 20 generates a signal of a specific frequency band (for example, 80 KHz) with the same predetermined periodicity as that of the output from the microcomputer 10. The output from generator 20 may be considered as a record mode discriminating signal.

A tape record state in SP mode is shown in FIG. 4A, and a tape record state in LP mode is shown in FIG. 4B. The SP mode discriminating signal is recorded with a period twice that of the period of the LP mode discriminating signal.

The first mixer 30 mixes the audio/video signal to be recorded with the discriminating signal from generator 20, and the second mixer 50 mixes the output of the first mixer with the output of the pilot signal generator 40. The mixed signal output from second mixer 50 is connected via switch 70 to a head provided in the head drum 60 where it is recorded onto an 8 mm video tape.

During a reproduction search mode, the recorded signal is picked up by the head in the head drum and supplied to the bandpass filter 80 via the switch 70. The bandpass filter 80 passes only the specific frequency band signal among the reproduction signals, i.e., the 80 KHz signal. Level detector 90 then detects the level of the signal output from bandpass filter 80 and outputs a logic "high" or logic "low" signal to microcomputer 10 depending upon whether the level of the discriminating signal passing through filter 80 is above or below a predetermined detecting minimum. The output from detector 90 is applied to the microcomputer 10, which determines the record mode of the signal being reproduced by comparing the periodicity of the detected signals from the level detector 90. The microcomputer then generates a servo control signal to control the speed of the magnetic tape in accordance with the detected record mode of the signal being reproduced, so that normal reproduction can be performed.

As described above, a record mode discriminating apparatus of the present invention records, onto a recording media, a record mode discriminating signal having a predetermined periodicity depending on the record mode used. During playback, the periodicity of the discriminating signal is detected to control the mode of playback so that it corresponds to the record mode.

What is claimed is:

1. In a magnetic recording and reproducing system of the type which records an analog audio and video signal on a recording medium at selected record mode speeds, and which reads out recorded signals from said recording medium, said system having also a read and write head, the improvement comprising:

means for generating a record mode discrimination signal having a predetermined frequency and a periodicity within the signal that is dependent upon said record mode, mixer means for mixing said record mode discrimination signal with said audio and video signal and a pilot signal to provide a mixed signal and for applying said mixed signal to said read and write head for recording on said recording medium, whereby the recording of said record mode discrimination signal along with said audio and video signal enables the detection of the record mode for said recorded signal.

2. The magnetic recording and reproduction system of claim 1, further comprising:

means responsive to said signals read from said recording medium for detecting said record mode discrimination signal from among said read out signal, and means responsive to said detecting means for determining the record mode of said signal read from said recording medium.

3. The magnetic recording and reproduction system as claimed in claim 2, further comprising:

means responsive to said determining means for controlling the speed of said recording medium during a playback operation to cause the mode of playback to correspond to the record mode used during the recording of said signal.

4. The magnetic recording and reproduction system of claim 3, wherein said means for generating a record mode discrimination signal comprises:

periodic pulse generator means responsive to a record mode input signal indicating the record mode in use for generating a periodic signal whose period is dependent upon the mode of said record mode; and a frequency generator responsive to said periodic signal from said periodic pulse generator for generating a burst of a predetermined frequency in response to each said periodic signal.

5. The magnetic recording and reproduction system of claim 4, wherein said system records a pilot tracking signal along with said audio and video signal and wherein said predetermined frequency is outside the band of frequencies occupied by said audio and video signal and said pilot signal.

6. The magnetic recording and reproduction system of claim 5 wherein said mixer means comprises:

a first mixer having one input terminal connected to receive said record mode discrimination signal, a second terminal connected to receive said audio and video signal to be recorded, and an output terminal for providing a signal which is a mixture of the signals applied to the two inputs thereto, and a second mixer having one input terminal connected to receive the output from said first mixer, a second input terminal connected to receive said pilot signal, and an output terminal for providing a signal which is a mixture of the signals applied to the two inputs thereto.

7. The magnetic recording and reproduction system of claim 6, wherein said means for detecting said record mode discrimination signal from among said signal read from said recording medium comprises a band pass filter having a pass band which passes said predetermined frequency but blocks the frequencies of said audio and video signal and said pilot signal.

8. The magnetic recording and reproduction system of claim 7 wherein said means for determining said record mode comprises a level detector for detecting the level of the signal passing through said bandpass filter.

9. The magnetic recording and reproduction system of claim 8 2 wherein record modes are long play (LP) and standard play (SP).

10. A record mode discriminating apparatus used in a magnetic recording and reproducing system, which records an analog audio and video signal having a predetermined frequency band and a pilot signal for an automatic track finding onto record media by means of a head, and reproduces said audio and video signal from said record media by employing the head, said apparatus comprising:

record mode discriminating signal generating means for generating a record mode discriminating signal of a specific frequency band having a periodicity within the signal that is to be varied depending on a record mode;

mixing means for mixing said record mode discriminating signal, said audio and video signal and said pilot signal and transferring the mixed signal to said head;

detecting means for detecting a signal of a specific frequency band whereon said record mode discriminating signal is loaded, among the signals reproduced by said head; and discriminating means for generating a predetermined periodicity to be varied according to a record mode, and detecting the level of the signal output from said detecting means, and for discriminating the recorded mode by comparing the periodicity that the level is detected with the predetermined periodicity.

11. A record mode discriminating apparatus according to claim 10, wherein said discriminating means comprises:

a level detector for detecting the level of a signal output from said detecting means; and a microcomputer for generating a predetermined periodicity to be varied in accordance with the inputting of a key corresponding to a record mode when recording is performed, and for discriminating a record mode by comparing the periodicity when the level is detected in said level detector with said predetermined periodicity, and for generating a servo control signal depending on said discriminated record mode and outputting the result.

12. An apparatus according to claim 10, wherein said record mode discriminating signal generating means generates a standard play (SP) mode discriminating signal at a periodicity interval longer than that of a long play (LP) mode discriminating signal.

13. An apparatus according to claim 10, wherein said detecting means detects a signal of a specific frequency band wherein said record mode discriminating signal is loaded when reproduction is performed in a search mode.

* * * * *